US011978186B2

(12) United States Patent
Aokage

(10) Patent No.: US 11,978,186 B2
(45) Date of Patent: May 7, 2024

(54) APPARATUS AND METHOD FOR CREATING A NOISE ESTIMATION MODEL

(71) Applicant: Canon U.S.A., Inc., Melville, NY (US)

(72) Inventor: Hironori Aokage, Plainview, NY (US)

(73) Assignees: Canon U.S.A., Inc., Melville, NY (US); Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 17/076,214

(22) Filed: Oct. 21, 2020

(65) Prior Publication Data
US 2021/0118120 A1    Apr. 22, 2021

Related U.S. Application Data

(60) Provisional application No. 62/924,413, filed on Oct. 22, 2019.

(51) Int. Cl.
*G06N 20/00*     (2019.01)
*G06T 7/00*      (2017.01)
*H04N 23/71*     (2023.01)

(52) U.S. Cl.
CPC .......... *G06T 7/0002* (2013.01); *G06N 20/00* (2019.01); *G06T 7/97* (2017.01); *H04N 23/71* (2023.01); *G06T 2207/20081* (2013.01)

(58) Field of Classification Search
CPC .............. G06T 7/0002; G06T 7/97; G06T 2207/20081; G06N 20/00; H04N 23/71; H04N 23/80
USPC ........................................................ 382/100
See application file for complete search history.

(56) References Cited

U.S. PATENT DOCUMENTS

2013/0089268 A1* 4/2013 Nguyen ............... H04N 1/409
                                                         382/254

* cited by examiner

*Primary Examiner* — Stephen P Coleman
(74) *Attorney, Agent, or Firm* — Canon U.S.A., Inc., IP Division

(57) ABSTRACT

An image processing apparatus and method is provided and includes one or more processors and one or more memory devices that store instructions. When the instructions are executed by the one or more processors, the one or more processors are configured to perform operations including obtaining a first image which is obtained by capturing based on a first shooting parameter, generating, by image processing on the first image, a second image corresponding to a second shooting parameter which is different from the first shooting parameter and using at least the generated second image as a training image for a model that is used in noise estimation processing for an input image.

15 Claims, 5 Drawing Sheets

APPARATUS AND METHOD FOR CREATING A NOISE ESTIMATION MODEL

CROSS REFERENCE TO RELATED APPLICATIONS

This is a nonprovisional patent application that claims the benefit of U.S. Provisional Patent Application Ser. No. 62/924,413 filed on Oct. 22, 2019, the entirety of which is incorporated herein by reference.

BACKGROUND

Field

The present disclosure relates to an improved manner for training a machine learning model.

Description of Related Art

During image analysis, is it known to estimate an amount of noise in an image to detect the quality thereof. One manner in which noise estimation is performed is using a trained machine learning model. A drawback associated with this is that much training data is necessary for training the model and is generally acquired by capturing many photos with for the model. Even if one were to capture the significant number of photos that would be needed to properly train a model to estimate noise, the trained model would be less accurate because the captured images generally only enable estimate of noise based on ISO and/or camera noise reduction settings. A system and method according to the present disclosure remedies the drawbacks discussed above by providing an improved training mechanism

SUMMARY

According to an embodiment, an image processing apparatus is provided and includes one or more processors and one or more memory devices that store instructions. When the instructions are executed by the one or more processors, the one or more processors are configured to perform operations including obtaining a first image which is obtained by capturing based on a first shooting parameter, generating, by image processing on the first image, a second image corresponding to a second shooting parameter which is different from the first shooting parameter and using at least the generated second image as a training image for a model that is used in noise estimation processing for an input image.

These and other objects, features, and advantages of the present disclosure will become apparent upon reading the following detailed description of exemplary embodiments of the present disclosure, when taken in conjunction with the appended drawings, and provided claims.

Figure 1:
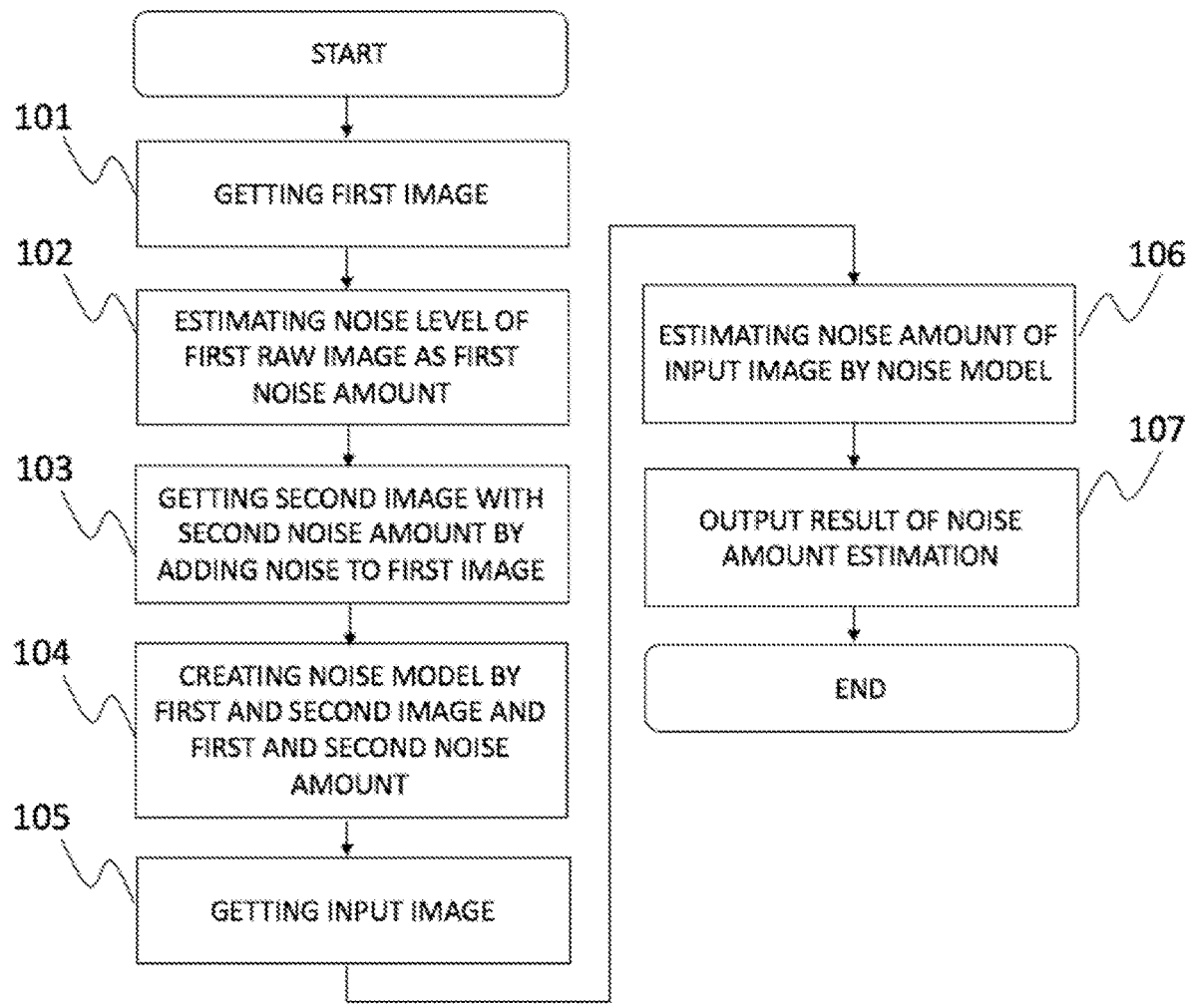
FIG. 1 is a flow diagram detailing an algorithm for implementing the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

According to the present disclosure, a method and system for improving training of a machine learning model (hereinafter, "model") is provided. In one embodiment, the model being trained is an image processing machine learning model that can estimate noise in an image being processed thereby. The present disclosure advantageously describes a training method that saves labor for training the model. More specifically, when training a model, much training data is necessary for training the model. In the case of a model that will be used for image analysis, the training data is generally obtained by shooting many photos. To achieve high accuracy in a model for estimating noise, a variety of noise images are necessary for training. This includes images with different types of noise that may be caused my different image parameters. However, if one were to merely train the model with images captured by camera shooting, the noise in those images are limited to noise as a result of a particular ISO setting or selected type of noise reduction (NR) settings.

NR settings are camera-based settings that determine a type of image processing to be performed which reduces noise in the image being captured. The effectiveness of using images generated by NR is limited because noise cannot be added with this process and the detail in the image is generally lost in the resulting image. Thus, we are unable to obtain sufficient quality of training images using because we are unable to deviate from images created by the single NR setting. On the other hand, controlling ISO setting to get variety of noise images is common way to control noise amount when camera shooting. Since ISO setting is determined only when shooting is done, the number of images should shot by camera is the amount of images we would like to obtain. Therefore it is not efficient to shoot all of images to get variety of images with different noise amounts.

An exemplary algorithm that resolves the deficiencies described above that is stored in a memory and executed by one or processors (CPUs) is provided in the flow chart illustrated in FIG. 1.

In Step 101, first image data is obtained. In this embodiment, this image data is raw image data acquired by camera shooting setting with a first shooting parameter. In one embodiment, the first shooting parameter is an ISO value. This image is saved into a memory having the first shooting parameter associated therewith. In one embodiment, first image data is captured by an image capture device such as a camera. In another embodiment, first image data is acquired from a sequence of images such as video data stream and extracted therefrom. In this embodiment, the video data is captured according to the first shooting parameter. In another embodiment, the first image data is stored in a repository that has one or more image data stored therein. In certain embodiments, the repository may be organized as collections of images captured using respective different types of shooting parameters.

In Step 102, estimation of first image noise amount is performed by one or more processors and set as first noise amount. Since the plurality of techniques to estimate noise amount are generally well-known, the method of estimation here does not need to be limited with specific technique. As such, any noise estimation processing may be used in this part of the algorithm.

Figure 2:
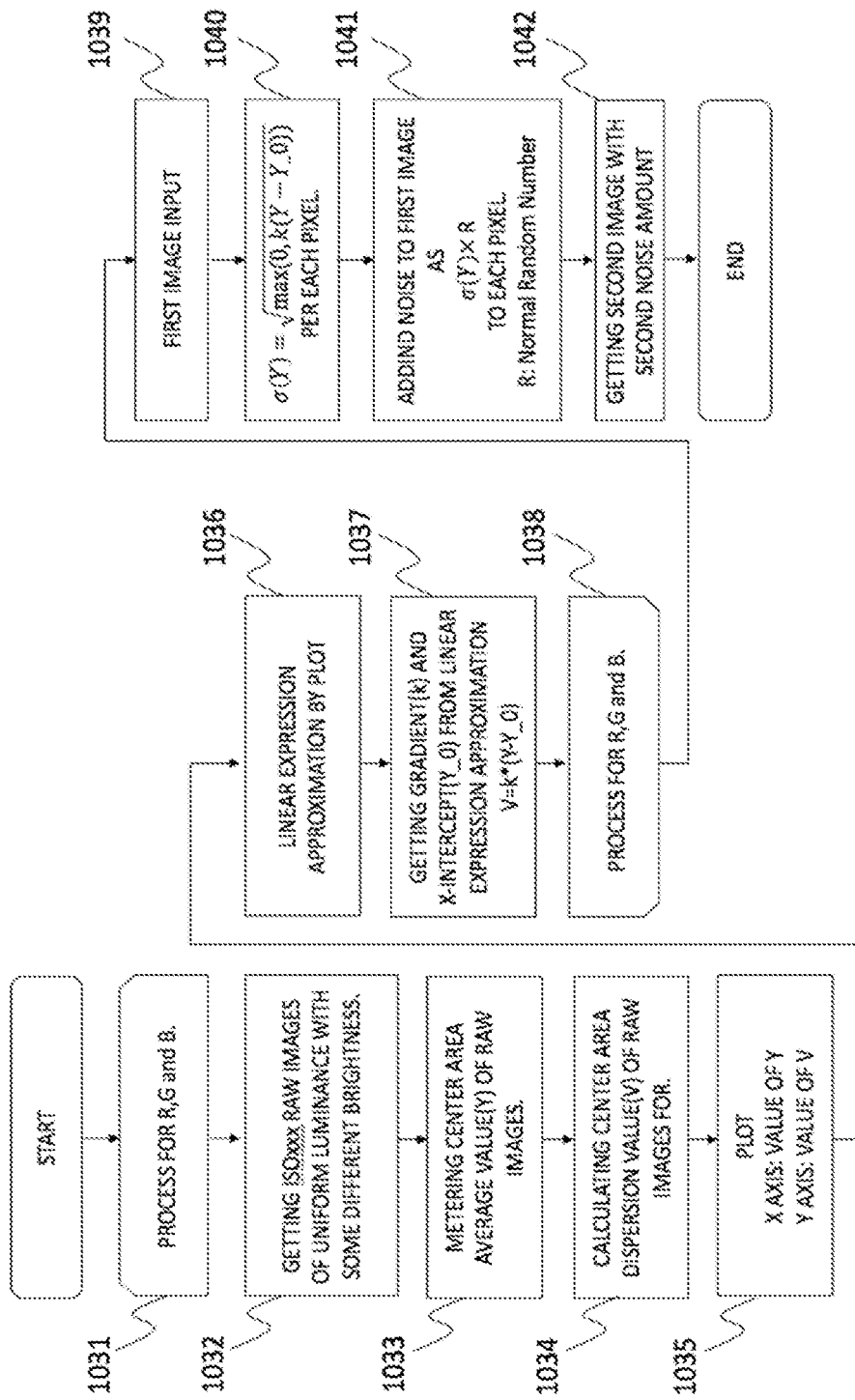
FIG. 2 is a flow diagram detailing an algorithm for implementing the present disclosure.

In Step 103, second image data with second noise amount, equivalent to a second shooting parameter, is obtained by adding noise to first image data stored in memory to generate the second image data. The algorithm for performing activities comprising step 103 is illustrated in the flow diagram of FIG. 2. This, for example, may run as a subroutine of the algorithm shown in FIG. 1. Alternatively, the flow diagram in FIG. 2 may represent a separate algorithm that is called upon by the algorithm in FIG. 1. It should be noted that steps 1031-1038 are repeated for each channel of the first image data. More specifically, steps 1031-1038 are repeated for the Red (R), Green (G) and Blue (B) elements in each image upon which this process is executed. In other embodiments, these steps may be performed on only one or two of the channels of the first image data.

In Step 1032, multiple raw images are obtained. These raw images are obtained by multiple image capture processes using an image capture device such as a camera. The multiple raw images captured represent a predetermined shooting area and each include different exposures and in the same ISO speed x (e.g. ISO 500). Preferably, at least a part of the shooting area has uniform luminance. In other words, the raw images correspond to the same ISO but different brightness levels per image.

Figure 3:
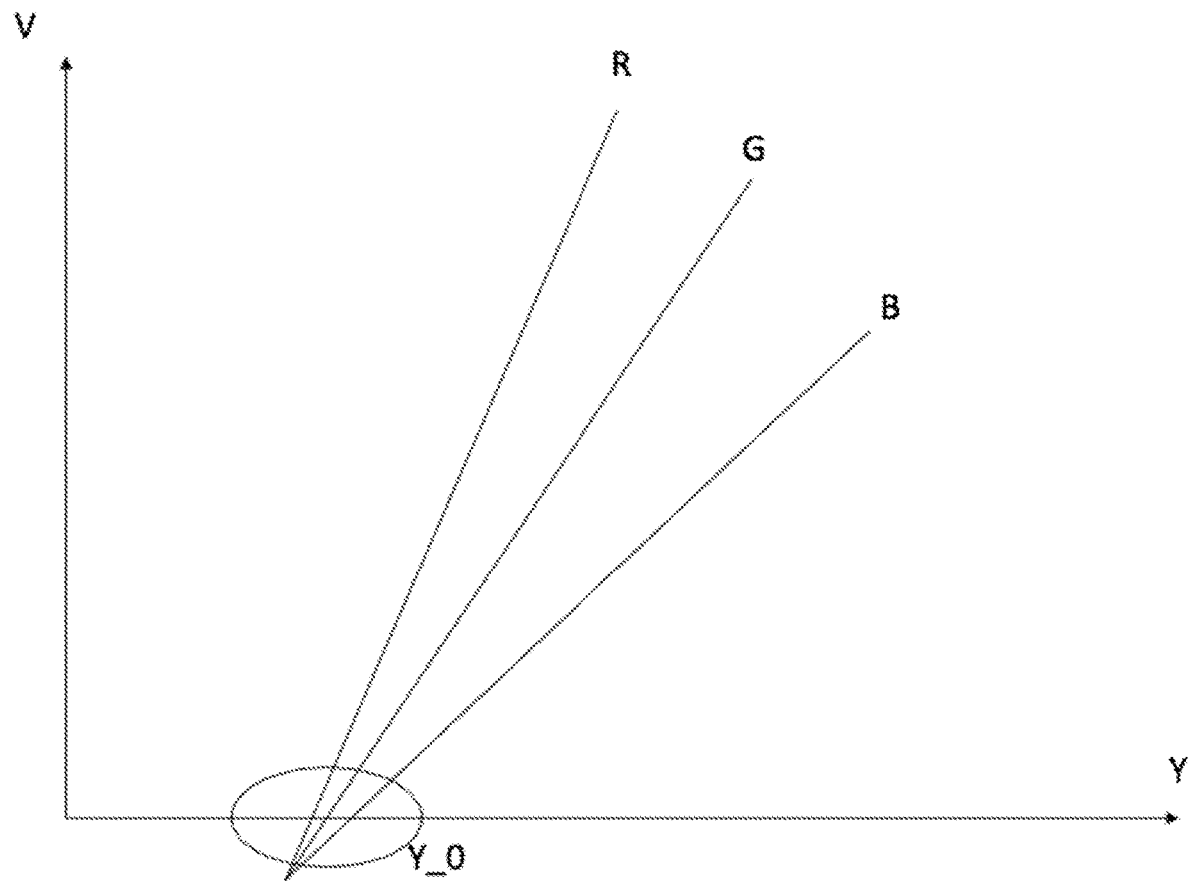
FIG. 3 is a graph depicting dispersion values calculated according to an algorithm of the present disclosure.

In Step 1033, an area average value of the raw images Y are calculated. An area does not need to be specified, but more accurate result can be obtained if the area that has a uniform pixel value is used for calculation. In Step 1034, a dispersion value V of the raw images is calculated. Even though the area used for calculation is the same as step 1033, it does not need to be specified as this area. In Step 1035, value Y and V, obtained in Step 1033 and 1034, respectively, are plot on the graph as shown in the FIG. 3. In the graph, the value of Y is plotted on the x-axis and the value of V is plotted on the y-axis. In Step 1036, linear expression approximation is performed by the plot in Step 1035. FIG. 3 describes the example of this linear expression approximation. There are three lines, each lines are expressing R, G and B linear expression approximation, described in the graph. In Step 1037, the gradient k and x-intercept Y_0 are obtained from the graph shown in FIG. 3. So through 1031 to 1038, the expression of V=k*(Y−Y_0) can be obtained for each elements, R, G and B.

In Steps 1039 through 1042, the algorithm adds the noise calculated based on the parameters obtained in the previous steps. In Step 1039, first image data is input. The first image data is the image captured by camera with using the first shooting parameter (e.g. ISO100). This is merely exemplary and the first shooting parameter may be any noise control related parameter and is not necessarily limited to this type of setting or the particular value of this setting.

In Step 1040, the one or more processors performs calculation on a per-pixel basis using the formula in Equation (1) below.

$$\sigma(Y)=\sqrt{\max(0,k(Y-Y\_0))} \quad (1)$$

In Equation 1, Y represents the actual pixel value of the image and Y_0 represents a value on the Y axis in FIG. 3. More specifically, Y−) is calculated based on a Y value and each line segment in FIG. 3. Then in Step 1041, noise is added to each pixel of the first image data according to the formula in Equation (2) below.

$$N=\sigma(Y)\times R \quad (2)$$

In this expression, N represents the noise added and R means normal random number. Using a normal random number R advantageously enables simulation of realistic noise such that by applying R, the resulting value N more closely simulates noise that might actually be present were the image captured by an image capturing device In Step 1042, as a result of the process from Step 1031 to 1041, second image with second noise amount is generated from the first image data by adding noise amount N to first image. Here, if the noise amount is determined considering development method or strength of noise reduction for the first image in addition to the noise amount obtained in Step 1041, the accuracy of second image can be higher and is thus improved. Also, third and fourth images can be generated with third and fourth shooting parameter from the first image by adding predetermined amounts of noise. If the second shooting parameter is, for example, ISO500, and third shooting parameter is, for example, ISO1000, the noise amount added to first image to generate third image, is larger than the noise amount added to first image to generate second image.

Returning back to FIG. 1, in Step 104, a noise model is created based on first and second images, and first and second noise amount. These images and noise amount are used for training of noise model. A Neural Network (NN) is used for training in this example, but other machine learning algorithms such as Deep Learning technology or the like may be used to create the model based on the newly generated training images generated in accordance with the above algorithm. It should also be noted that, even though the algorithm described herein references first and second images and first and second noise amounts, in practice, this algorithm is used a plurality of times to generate multiple images with different noise amounts that are used to train the noise model. Furthermore, a cascade of new images can be formed from a relatively low number of original images.

In Step 105, an input image to be evaluated is input to the noise model which has been trained in step 104. In one embodiment, an image capture device such as a camera or smartphone are used to capture this image. The model trained in accordance with the training process of S104 is used to estimate an amount of noise of the input image in Step 106, and result of the estimation is output in step 107. In this step, the result of noise amount might be output on display to show the result, or might be added as the tag to actual image. The estimation performed in S106 and output in S107 may list a shooting parameter and the estimated noise value. In all instances, shoot parameters include but is not limited to ISO speed, exposure, shutter speed, aperture or iris. Also, the device generating second image might be same as the device estimating noise amount of input image, or might be different from the devise estimating noise amount of input image.

As noted above, the noise estimation model is generated and applied as follows in an apparatus, as a method and/or stored on a non-transitory computer readable storage medium. One or more processors and one or memories are provided. In the one or more memories, an algorithm is stored and is executed by the one or more processors. Upon execution thereof, the one or more processors are configured to cause an apparatus such as an image processing apparatus to perform certain operations. These operations executed by the one or more processors include obtaining a first image captured by an image capturing device based on a first shooting parameter (e.g. one or more of ISO speed, exposure, shutter speed, aperture and iris). Image processing is performed on the captured first image to generate a second image corresponding to a second shooting parameter which is different from the first shooting parameter. The generated second image is used as a training image for noise estimation processing for an input image. The second image may be generated by adding noise to the first image based on a difference between the first and second shooting parameters. The second image may also be generated by adding, to the first image, a noise based on the first and second shooting parameters, a method used for noise reduction, and a strength value of the noise reduction used.

According to the present disclosure, a plurality of training images are advantageously generated by using the first image. In one embodiment, each of the plurality of training images generated correspond to a different shooting parameter. In another embodiment, a plurality of images including both of the second image corresponding to the second shooting parameter and a third image corresponding to a third shooting parameter that is different from the first and second shooting parameters are generated from the first image and are used as training images.

In another embodiment, processing is performed for estimating a noise amount of a region in which a difference of luminance is not exceeded a predetermined range within the first image and the second image is generated in the generating by adding a noise based on the first and second shooting parameters into the first image. In one embodiment, the second image and a noise parameter corresponding to the second image are transmitted to an estimation apparatus which performs the noise estimation processing for the input image. Noise estimation processing may be performed on the input image, wherein the noise estimation processing is controlled so that the processing is performed using at least the second image.

Figure 4:
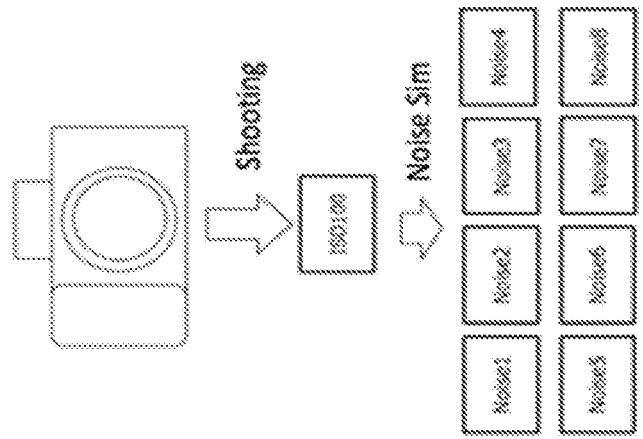
FIG. 4 illustrates a mechanism for generating training data according to the present disclosure.
Figure 4:
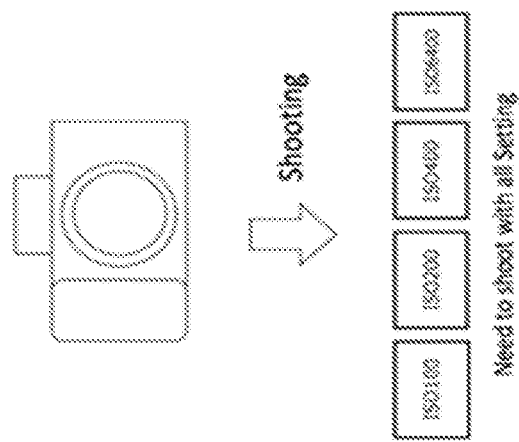

The advantages of the above described embodiments are illustrated in FIG. 4 which shows a more efficient mechanism for generating training data that is used to train a machine learning model. In doing so, in addition to the elimination of the manual requirement to set different shooting parameters to obtain images, the above described disclosure allows for improved training data to be generated. More specifically, instead of the image data merely being generated by static in-camera shooting parameters, the above embodiments allow for alterations of the shooting parameters values used to generate the training image data to expand beyond predefined shooting values. This provides an improved type and number of training data to be generated which ultimately improves the noise estimation model for which these images are training. It therefore follows that the, operation of the generated noise estimation model on an input image will be improved in order to better categorize or otherwise identify noise contain in an input image processed according to the trained noise estimation model.

Figure 5:
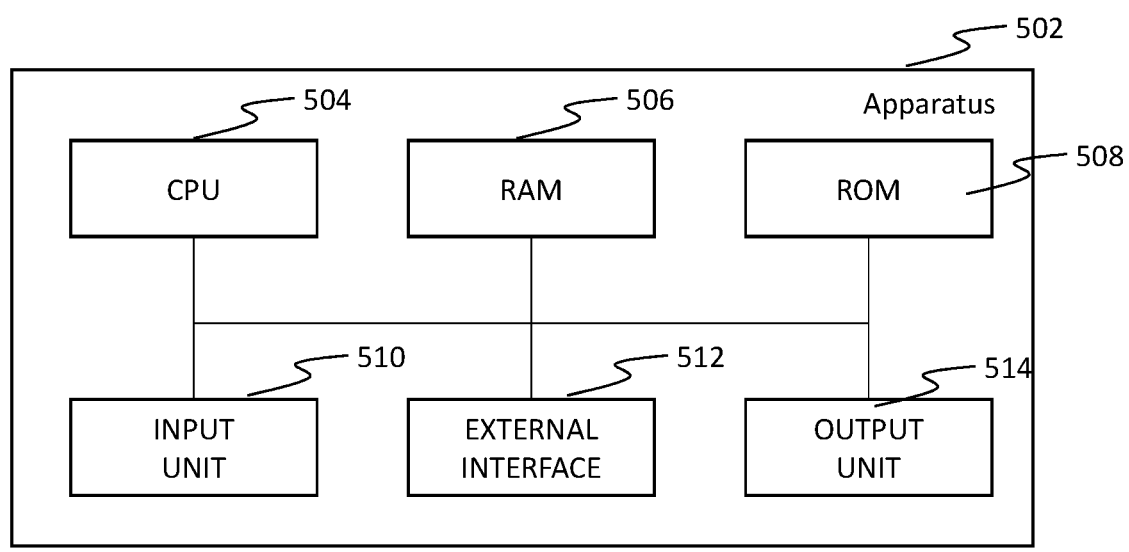
FIG. 5 is a block diagram of hardware for implementing the present disclosure.

FIG. 5 illustrates the hardware of an apparatus that can be used in implementing the above described disclosure. The apparatus 502 includes a CPU 504, a RAM 506, a ROM 508, an input unit 510, an external interface 512, and an output unit 514. The CPU 504 controls the apparatus 502 by using a computer program (one or more series of stored instructions executable by the CPU) and data stored in the RAM 506 or ROM 508. Here, the apparatus may include one or more dedicated hardware or a graphics processing unit (GPU), which is different from the CPU 504, and the GPU or the dedicated hardware may perform a part of the processes by the CPU 504. As an example of the dedicated hardware, there are an application specific integrated circuit (ASIC), a field-programmable gate array (FPGA), and a digital signal processor (DSP), and the like. The RAM 506 temporarily stores the computer program or data read from the ROM 508, data supplied from outside via the external interface 512, and the like. The ROM 508 stores the computer program and data which do not need to be modified and which can control the base operation of the apparatus. The input unit 510 is composed of, for example, a joystick, a jog dial, a touch panel, a keyboard, a mouse, or the like, and receives user's operation, and inputs various instructions to the CPU 504. The external interface 512 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 514 is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An image processing apparatus comprising:
   one or more processors; and
   one or more memory devices that store instructions which, when executed by the one or more processors configures the one or more processors to perform operations including:
   obtaining, by the one or more processors, a first image captured by an image capture device, the obtained first image having been captured based on a first shooting parameter of the image capture device;
   generating, by the one or more processors, a second image by performing image processing on the obtained first image, the generated second image corresponds to a second shooting parameter of the image capture device that captured the first image and which is different from the first shooting parameter of the image capture device; and
   training, by the one or more processors, a noise estimation model by inputting, into the noise estimation model stored in the one or more memory devices, at least the generated second image as a training image, wherein the trained noise estimation model is stored in the one or more memory devices and used to perform noise estimation processing for an input image.

2. The apparatus according to claim 1, wherein execution of the one or more processors to perform operations including:
   generating, by the one or more processors, a plurality of training images using the first image, and wherein each of the plurality of training images corresponds to a different shooting parameter of the image capture device.

3. The apparatus according to claim 1, wherein execution of the one or more processors to perform operations including:
   generating, by the one or more processors, a plurality of images including both of the second image corresponding to the second shooting parameter of the image capture device that captured the first image and a third image which corresponds to a third shooting parameter that is different from the first and second shooting parameters of the image capture device that captured the first image; and
   training, by the one or more processors, the noise estimation model by inputting into the model stored in one or more memory devices, the second image and third image.

4. The apparatus according to claim 1, wherein the second image is generated by the one or more processors by adding, to the first image, a noise value based on a difference between the first and second shooting parameters.

5. The apparatus according to claim 1, wherein execution of the instructions further configures the one or more processors to perform operations including
   estimating, by the one or more processors, a noise amount of a region of the obtained first image in which a difference of luminance does not exceed a predetermined range, wherein the second image is generated by adding noise into the first image based on the first and second shooting parameters of the image capture device that captured the first image.

6. The apparatus according to claim 1, wherein the second image is generated by the one or more processors by adding, to the first image, a noise value based on the first and second shooting parameters.

7. The apparatus according to claim 1, wherein, the second image and a noise parameter corresponding to the second image are transmitted to an estimation apparatus which performs the noise estimation processing for the input image.

8. The apparatus according to claim 1, wherein execution of the instructions further configures the one or more processors to perform operations including
   performing the noise estimation processing for the input image, wherein the noise estimation processing is performed by the trained model stored in the one or more memory devices that was trained using at least the second image.

9. The apparatus according to claim 1, wherein the shooting parameter is at least one of ISO speed, exposure, shutter speed, aperture and iris.

10. An image processing method comprising:
    obtaining, by one or more processors, a first image captured by an image capture device, the obtained first image having been captured based on a first shooting parameter of the image capture device;
    generating, by the one or more processors, a second image by performing image processing on the obtained first image, the generated second image corresponds to a second shooting parameter of the image capture device that captured the first image and which is different from the first shooting parameter of the image capture device; and
    training, by the one or more processors, a noise estimation model by inputting, into the noise estimation model stored in the one or more memory devices, at least the generated second image as a training image, wherein the trained noise estimation model is stored in the one or more memory devices and used to perform noise estimation processing for an input image.

11. The method according to claim 10, further comprising generating, by the one or more processors, a plurality of training images using the first image, and wherein each of the plurality of training images corresponds to a different shooting parameter of the image capture device.

12. The method according to claim 10, further comprising generating, by the one or more processors, a plurality of images including the second image corresponding to the second shooting parameter of the image capture device that captured the first image and a third image which corresponds to a third shooting parameter that is different from the first and second shooting parameters of the image capture device that captured the first image; and training, by the one or more processors, the noise estimation model by inputting into the model stored in one or more memory devices, the second image and third image.

13. A non-transitory computer-readable storage medium storing instructions that when executed by one or more processors configures an apparatus to perform an image processing method, the image processing method comprising:

obtaining by one or more processors, a first image captured by an image capture device, the obtained first image having been captured based on a first shooting parameter of the image capture device;

generating, by the one or more processors, a second image by performing image processing on the obtained first image, the generated second image corresponds to a second shooting parameter of the image capture device that captured the first image and which is different from the first shooting parameter of the image capture device; and training, by the one or more processors, a noise estimation model by inputting, into the noise estimation model stored in the one or more memory devices, at least the generated second image as a training image, wherein the trained noise estimation model is stored in the one or more memory devices and used to perform noise estimation processing for an input image.

14. The non-transitory computer-readable storage medium according to claim 13 further comprising generating, by the one or more processors, a plurality of training images using the first image, and wherein each of the plurality of training images corresponds to a different shooting parameter of the image capture device.

15. The non-transitory computer-readable storage medium according to claim 13, further comprising generating, by the one or more processors, a plurality of images including the second image corresponding to the second shooting parameter of the image capture device that captured the first image and a third image which corresponds to a third shooting parameter that is different from the first and second shooting parameters of the image capture device that captured the first image; and training, by the one or more processors, the noise estimation model by inputting into the model stored in one or more memory devices, the second image and third image.

* * * * *